US009899695B2

(12) United States Patent
Kniajanski et al.

(10) Patent No.: US 9,899,695 B2
(45) Date of Patent: Feb. 20, 2018

(54) ZINC-BASED ELECTROLYTE COMPOSITIONS, AND RELATED ELECTROCHEMICAL PROCESSES AND ARTICLES

(71) Applicant: GENERAL ELECTRIC COMPANY, Schenectady, NY (US)

(72) Inventors: Sergei Kniajanski, Clifton Park, NY (US); Grigorii Lev Soloveichik, Reston, VA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 214 days.

(21) Appl. No.: 14/720,005

(22) Filed: May 22, 2015

(65) Prior Publication Data

US 2016/0344056 A1 Nov. 24, 2016

(51) Int. Cl.
*H01M 8/18* (2006.01)
*C25D 3/22* (2006.01)
*C25D 17/10* (2006.01)

(52) U.S. Cl.
CPC .............. *H01M 8/188* (2013.01); *C25D 3/22* (2013.01); *C25D 17/10* (2013.01); *H01M 2250/10* (2013.01); *H01M 2250/20* (2013.01); *Y02B 90/14* (2013.01); *Y02E 60/528* (2013.01); *Y02T 90/32* (2013.01)

(58) Field of Classification Search
CPC ........... H01M 8/08; H01M 8/18; H01M 8/188
USPC ..................................................... 429/50, 51
See application file for complete search history.

(56) References Cited

U.S. PATENT DOCUMENTS

| | | | |
|---|---|---|---|
| 2,421,265 A | 5/1947 | Hogaboom | |
| 3,660,170 A | 5/1972 | Rampel | |
| 3,682,789 A | 8/1972 | Katumi et al. | |
| 3,694,330 A | 9/1972 | Joachim et al. | |
| 3,853,718 A | 12/1974 | Creutz | |
| 3,929,506 A * | 12/1975 | Leddy | H01M 4/661 429/199 |
| 4,048,381 A | 9/1977 | Adaniya et al. | |
| 4,076,600 A | 2/1978 | Huebner | |
| 4,162,947 A | 7/1979 | Canaris | |
| 4,170,526 A | 10/1979 | Creutz et al. | |
| 4,181,777 A | 1/1980 | Spaziante et al. | |
| 4,325,790 A | 4/1982 | Adaniya et al. | |
| 4,479,856 A | 10/1984 | Ando | |
| 5,318,865 A * | 6/1994 | Kaneko | B60L 11/1868 429/345 |
| 5,804,329 A * | 9/1998 | Amendola | B60L 11/1879 429/101 |
| 6,143,443 A * | 11/2000 | Kazacos | H01M 8/188 429/188 |
| 7,682,737 B2 | 3/2010 | Stauffer | |
| 8,282,806 B2 | 10/2012 | Furhmann | |
| 9,640,826 B2 * | 5/2017 | Yan | H01M 8/20 |
| 2004/0029019 A1 * | 2/2004 | Clarke | H01M 4/8631 429/347 |
| 2005/0239632 A1 * | 10/2005 | Clarke | B01J 49/57 502/12 |
| 2009/0092882 A1 | 4/2009 | Kjeang et al. | |
| 2010/0216006 A1 * | 8/2010 | Rennebeck | B60L 11/1803 429/105 |
| 2013/0183546 A1 * | 7/2013 | Joshi | C25B 13/04 429/50 |
| 2014/0072886 A1 | 3/2014 | Urban et al. | |
| 2014/0132238 A1 | 5/2014 | Zaffou et al. | |

FOREIGN PATENT DOCUMENTS

| | | | |
|---|---|---|---|
| DE | 2600636 A1 | | 7/1976 |
| WO | WO 99/39397 | * | 8/1999 |
| WO | 2004009869 A2 | | 1/2004 |
| WO | 2012161917 A1 | | 11/2012 |
| WO | 2014197842 A1 | | 12/2014 |

OTHER PUBLICATIONS

International Search Report and Written Opinion issued in connection with corresponding PCT Application No. PCT/US16/18583 dated May 2, 2016.
Ito et al., "Zinc morphology in zinc-nickel flow assisted batteries and impact on performance", Journal of Power Sources, ScienceDirect, vol. 196, (2011), pp. 2340-2345.
Wilcox et al.,"Electrolyte additives for zinc-anoded secondary cells I. Brighteners, levellers and complexants", Journal of Power Sources, ScienceDirect, vol. 28, Issue 4, pp. 345-359, Dec. 15, 1989.

* cited by examiner

*Primary Examiner* — Anca Eoff
(74) *Attorney, Agent, or Firm* — John P. Darling

(57) ABSTRACT

An aqueous electrolyte composition is described, including a zinc salt based on zinc acetate or zinc glocolate. The saturation concentration of zinc in the electrolyte composition is in the range of about 2.5M to about 3.5M. The composition also contains at least one salt of a monovalent cation. The molar ratio of zinc to the monovalent cation is about 1:2. An aqueous zinc electroplating bath, containing the aqueous electrolyte composition, is also disclosed, along with a method for the electrochemical deposition of zinc onto a substrate surface, using the electroplating bath. Related flow batteries are also described, including a catholyte, as well as an anolyte based on the aqueous electrolyte composition, with a membrane between the catholyte and the anolyte.

14 Claims, 5 Drawing Sheets

ZINC-BASED ELECTROLYTE COMPOSITIONS, AND RELATED ELECTROCHEMICAL PROCESSES AND ARTICLES

STATEMENT REGARDING FEDERALLY SPONSORED RESEARCH & DEVELOPMENT

This invention was made with Government support under DE-AR0000381, awarded by the Department of Energy-ARPA-E. The Government has certain rights in the invention.

BACKGROUND

The deposition or plating of zinc layers onto substrate surfaces finds widespread applications. Typically, zinc layers are very useful as functional coatings that are coated onto small iron-based parts, such as screws, nuts, and various structural parts. The zinc coating provides corrosion resistance, and in some cases, provides a smooth, decorative plating surface.

Moreover, due to its relatively low cost and good electrochemical properties, zinc has long been a desirable ingredient for the negative electrode or anode in rechargeable electrochemical cells (batteries) and fuel cells. A variety of energy storage devices that incorporate zinc have been produced, including zinc-air batteries, silver-zinc batteries, mercury-zinc batteries, and redox flow batteries. In the case of many of these devices, such as rechargeable, nickel-zinc flow batteries, the plating action of zinc is the primary electrochemical mechanism, somewhat analogous to the plating of articles for protective purposes. In other words, a zinc anode is alternately plated and then dissolved within an appropriate electrolyte bath. This type of redox reaction leads to the release of electrical energy, and alternately, the storage of electrical energy, when an external current is applied.

One problem with the use of zinc in electrochemical devices and plating systems is the formation of dendrites. The problem has been described in a number of references. The dendrites often form when zinc metal is deposited on an anode during the charging operation in an electrochemical cell, as zinc crystals form, typically as an overgrowth of a normal zinc deposit. The fractal zinc crystals or dendrites often have an elongate, pointed shape, and can penetrate the porous membrane of such a cell, causing the cell to short-circuit after only a small number of discharge and recharge cycles.

A number of methods have been disclosed for eliminating the problem of zinc dendrites, as described, for example, in U.S. Pat. No. 3,660,170 (Rampel). This patent describes the use of certain types of high-molecular weight polymers. These polymers can be used as additives in the electrolyte composition of an electrochemical cell, to inhibit the formation of the dendrites. Moreover, in other instances, extra layers of material are added to the membrane of an electrochemical cell, in a physical attempt to prevent penetration of the dendrites. However, additional techniques for addressing dendrite formation, especially during the operation of a cell at high current densities, would be welcome in the art. Preferred techniques would not require altering the membrane, or using specialized additives.

Additional needs are still present for zinc-based electrochemical cells. In the case of zinc plating baths, the ability to deposit smooth, adherent zinc layers by electroplating at high current densities would be of considerable interest, from both an economic viewpoint and a technical viewpoint. Moreover, in the case of zinc-based, rechargeable flow batteries, the ability to achieve greater energy and power (the amount of zinc stored per unit area; and high current density) would be very welcome in the art. This is especially the case for applications which are demanding greater performance from the battery, e.g., in grid applications, as well as electric vehicles.

BRIEF DESCRIPTION OF THE INVENTION

One embodiment of this invention is directed to an aqueous electrolyte composition, comprising
a) a zinc salt selected from zinc acetate, zinc glycolate, and combinations thereof, wherein the saturation concentration of zinc in the electrolyte composition is in the range of about 2.5M to about 3.5M; and
b) at least one salt of a monovalent cation selected from sodium, potassium, lithium, and ammonium; wherein the molar ratio of zinc to the monovalent cation is about 1:2.

Another embodiment of the invention is directed to an aqueous zinc electroplating bath. The bath comprises the aqueous electrolyte composition described herein.

Still another embodiment of the invention is directed to a method for the electrochemical deposition of zinc onto a substrate surface, comprising the step of contacting the substrate surface with an acidic, zinc-containing, electrolyte composition, comprising
a) a zinc salt selected from zinc acetate, zinc glycolate, and combinations thereof, wherein the saturation concentration of zinc in the electrolyte composition is in the range of about 2.5M to about 3.5M; and
b) at least one salt of a monovalent cation selected from sodium, potassium, lithium, and ammonium; wherein the molar ratio of zinc to the monovalent cation is about 1:2;
while applying an electrical current between the substrate and at least one zinc-containing anode, so as to induce the deposition of a layer of zinc onto the substrate.

Yet another embodiment of the invention is directed to a flow battery, comprising:
(a) a first chamber (catholyte) comprising an aqueous solution of at least one salt of a halogen oxoacid;
(b) a second chamber (anolyte) comprising an aqueous solution of an electrochemically active material that is capable of participating in a reduction-oxidation (redox) reaction with the salt of component (a);
(c) at least one membrane separating the first chamber from the second chamber; and
(d) means for flowing the aqueous solutions through the battery;
wherein the second chamber (anolyte) contains an electrodeposited zinc anode; and
wherein the aqueous solution of the electrochemically active material comprises
i) a zinc salt selected from zinc acetate, zinc glycolate, and combinations thereof, wherein the saturation concentration of zinc in the electrolyte composition is in the range of 2.5M to about 3.5M; and
ii) at least one salt of a monovalent cation selected from sodium, potassium, lithium, and ammonium; wherein the molar ratio of zinc to the monovalent cation is about 1:2.

DETAILED DESCRIPTION

Figure 1:
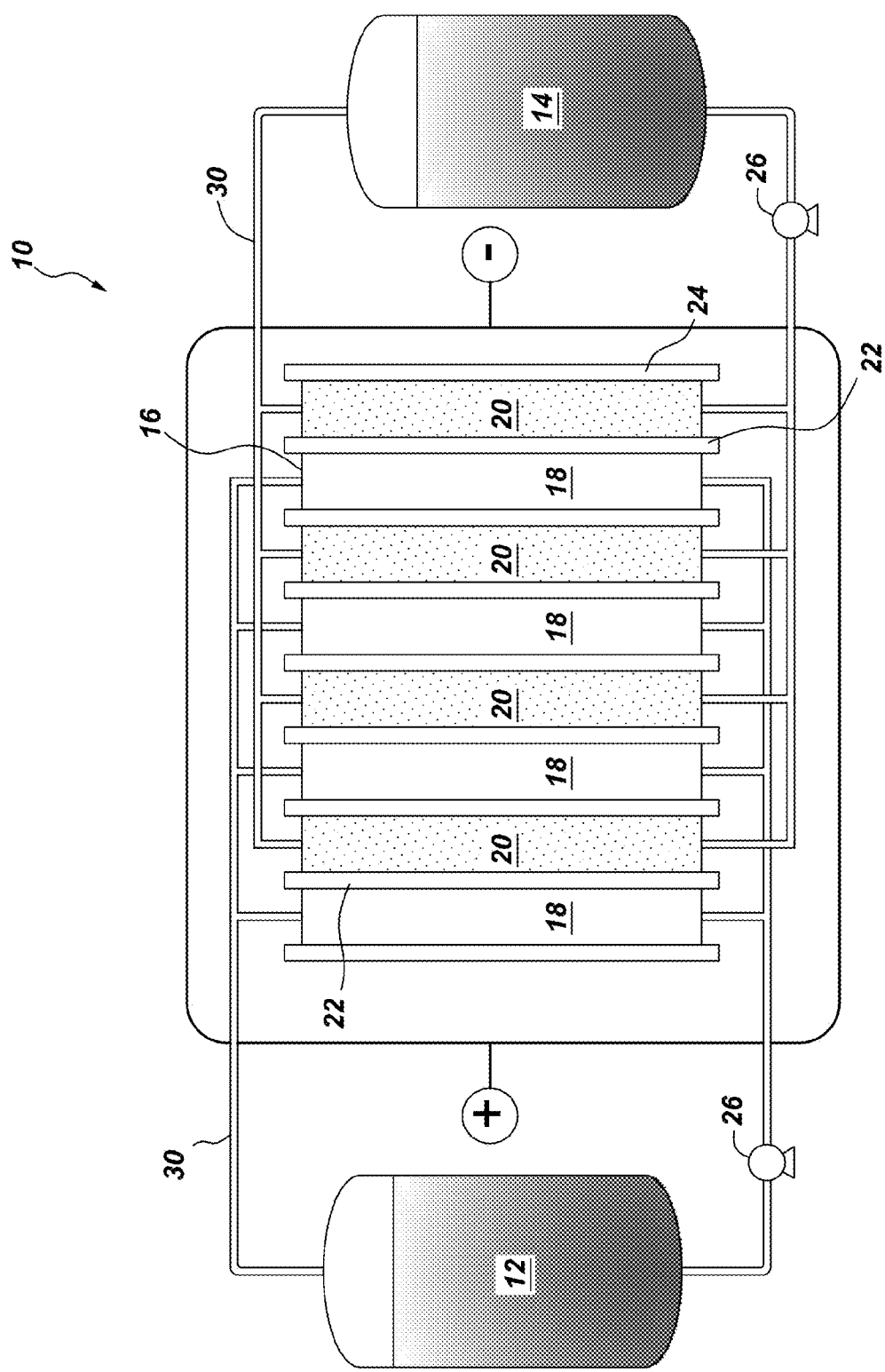
FIG. 1 is a simplified schematic of a flow battery according to one embodiment of this invention.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and claims, the singular forms "a", "an" and "the" include plural referents unless the context clearly dictates otherwise. As used herein, the term "or" is not meant to be exclusive; and refers to at least one of the referenced components being present; and includes instances in which a combination of the referenced components may be present, unless the context clearly dictates otherwise.

The aqueous electrolyte composition described herein is useful for a number of applications. The composition includes a zinc salt selected from zinc acetate or zinc glycolate. Combinations of the two salts may be used as well. The present inventors discovered that these two salts (the zinc salt and the monovalent cation salt, discussed below), at the specified ratios discussed below, are especially useful for the electrolyte composition, because they enable the incorporation of relatively high zinc concentrations in the electrolyte composition, when the composition is maintained at a pH greater than 5. This level of zinc at such a pH could not readily be achieved with highly soluble zinc salts, e.g., zinc salts of strong acids (chloride, bromide, iodide, sulfate, nitrate, and the like). In some embodiments, the preferred zinc salt is zinc acetate. In some other instances, certain other zinc salts might be appropriate, i.e., a zinc salt of a mild acid (e.g., one having a dissociation constant pKa of about 3-5), and having a salt-solubility in water of at least 1M, at 20° C.

The zinc salt (or the combination of zinc salts, in total) may be present up to the saturation limit within the composition, e.g., at a maximum concentration of about 2.5M to 3.5M. The zinc saturation limit within this range is dependent on the saturation limit of the particular zinc salt in its individual solution; the saturation limit of the particular monovalent cation salt(s) employed in its individual solution; and the required pH of the electrolyte in a given application, also discussed below. (The "saturation limit" is the saturation concentration of a zinc salt, i.e., without any precipitation). It should be understood, however, that the specific, desired concentration will depend on the intended end use. As an illustration, the maximum concentration of zinc salt(s) is often desirable for flow battery applications. However, a more dilute concentration may sometimes be desirable in a plating process, providing a smooth plating finish, for example.

The electrolyte composition further comprises at least one salt of a monovalent cation, as mentioned above. The cation can be an alkali metal such as sodium, potassium, or lithium; or it can be ammonium ($NH_4^+$). In most preferred embodiments, the molar ratio of zinc to the monovalent cation (or to the total moles of multiple cations) is about 1:2.

The choice of a particular monovalent cation will depend on a number of factors, some of which were mentioned above in regard to the choice of the zinc salt. When the electrolyte composition is part of a zinc flow battery, the present inventors discovered that the following criteria were most important: the concentration of zinc in the electrolyte; the electrolyte viscosity; the morphology of the zinc deposit; and the degree of corrosion of the zinc metal deposit. The last-mentioned factor is dependent on the pH of the electrolyte; the concentration of zinc; and the particular monovalent cation(s) used.

In some cases, lithium is the preferred monovalent cation salt, in that it can provide a greater concentration of zinc in the electrolyte. Moreover, the presence of lithium provides smooth zinc electrochemical deposition, and leads to less zinc corrosion, as compared to the other salts, even though lithium can lower the pH of the electrolyte to a greater extent than the other salts.

In other instances, ammonia is the preferred monovalent cation salt. The use of ammonia or lithium can ensure a greater concentration of zinc in the electrolyte solution. Moreover, ammonia is relatively inexpensive, and its presence, like that of lithium, may also lead to smooth zinc plating and relatively low corrosion of the zinc deposit. However, ammonia can in some environments (though not all) result in the formation of strong zinc dendrites that can penetrate an electrochemical cell membrane.

In other embodiments, sodium is the preferred monovalent cation salt. While not ensuring as great a concentration of zinc as perhaps lithium, sodium can also lead to relatively low zinc corrosion. Moreover, sodium is also relatively inexpensive.

As mentioned previously, some of the primary embodiments of this invention require the electrolyte composition to have a pH between about 3 and 7. This is especially the case for the zinc-based flow batteries described herein, and this contrasts with the basic environment often favored for other types of zinc batteries, e.g., zinc-air batteries. Flow batteries can function very efficiently in an acidic environment, with considerable improvement in the energy capacity of the battery.

In some embodiments, e.g., in the case of the operation of the flow batteries described herein, a pH in the range of about 4.5 to about 7 is especially preferred. In other embodiments, a pH in the range of about 3 to about 7 is acceptable. For example, in the case of zinc plating, a smoother plating surface may be obtained under conditions of greater acidity.

The operation of the zinc-based flow batteries highlighted in this disclosure—sometimes referred to as "zinc-chlorate" batteries—involves the plating of zinc during the electrochemical reaction, as mentioned previously. 12 protons are generated during the charging cycle, for every 1 (one) zinc atom that is plated. Since protons are the dynamic, mobile component for these types of batteries, a very high level of acid is generated during the charging cycle. However, the large amount of acid can greatly impede the necessary plating reaction, because all of the zinc immediately reacts with the acid.

In response, embodiments of the present invention are based in part on the discovery that the use of the monovalent cation in conjunction with the selected zinc salts according to this invention can advantageously slow down the reaction of zinc with the acid. The monovalent salts also advantageously increase the saturation limit of the zinc salts, which would otherwise have had very limited solubility in the electrolyte composition. In addition to the advantages for zinc batteries, described further below, these compositions can provide fast, smooth, electrochemical deposition of zinc (e.g., onto an anode structure), at relatively high current densities and high zinc concentrations.

As mentioned above, another embodiment of the invention relates to an aqueous zinc electroplating bath. Those skilled in the art are familiar with some of the details regarding such baths. They are described, for example, in U.S. Pat. No. 4,162,947 (V. Canaris) and U.S. Pat. No. 4,076,600 (K. Heubner), both incorporated herein by reference. As in the case of most electroplating baths, the required apparatus requires two electrodes (including a zinc anode), an electrolyte, and a supply of electricity. Acidic zinc plating baths also sometimes employ a number of additives. Non-limiting examples include levelling agents, buffers, surface active agents to reduce pitting; and brightness agents.

The electroplating bath comprises the aqueous electrolyte composition that was also described previously. This includes the zinc salt selected from zinc acetate, zinc glycolate, and combinations thereof, wherein the saturation concentration of zinc in the electrolyte composition is in the range of about 2.5M to about 3.5M. The additional constituent is at least one salt of a monovalent cation selected from sodium, potassium, lithium, and ammonium; wherein the molar ratio of zinc to the monovalent cation is about 1:2. As mentioned previously, the use of this type of aqueous electrolyte composition can result in the efficient deposition of a smooth, adherent zinc layer on a desired substrate.

Other operational details regarding the plating process can be found in this disclosure, supplemented with the knowledge of those skilled in the art. The plating bath temperature will usually be in the range of about 20° C. to about 60° C. Moreover, in some embodiments, the bath will be maintained at a pH between 3 and 7, depending on the particular electrolyte composition. No additional buffer will usually be needed. The current density for plating will usually range from about 30 ASF (amps per square foot) to about 250 ASF (i.e., 32 mA/cm$^2$ to 269 mA/cm$^2$). Plating times will depend in part on the nature of the substrate, the desired thickness of the zinc layer; and the current density used in the process.

Another embodiment of the invention is directed to a flow battery, based in part on the aqueous electrolyte composition described previously. A flow battery of this type is generally described in published Application PCT/US14/041374 (G. Soloveichik et al), and the contents of that Application are incorporated herein by reference. The battery includes a first chamber, known as a catholyte, comprising an aqueous solution of at least one salt of a halogen oxoacid. Exemplary salts of this type are compounds having the formula $HXO_3$, where X is chlorine, bromine, or iodine. (Flow batteries of this type are often configured to promote the reversible redox (oxidation-reduction) reaction that converts oxohalogenate ions ($XO_3^-$) to halogenide ions ($X^-$), wherein X is chlorine (Cl), bromine (Br), or iodine (I). The oxoacid is often chloric acid, $HCLO_3$, with the corresponding salt being a chlorate salt, as mentioned below).

The flow battery also includes a second chamber (an anolyte), comprising an aqueous solution of an electrochemically active material that is capable of participating in a reduction-oxidation (redox) reaction with the salt of the first component, i.e., the salt of the halogen oxoacid. The aqueous solution of the electrochemically active material comprises a) a zinc salt selected from zinc acetate, zinc glycolate, and combinations thereof, wherein the saturation concentration of zinc in the electrolyte composition is in the range of 2.5M to about 3.5M; and b) at least one salt of a monovalent cation selected from sodium, potassium, lithium, and ammonium; wherein the molar ratio of zinc to the monovalent cation is about 1:2.

The aqueous solution of the electrochemically active material can further comprise acetic acid, in some embodiments. The aqueous solution can be maintained at a pH between about 3 and 7, but is preferably at a pH between about 4.5 and 7 (in some cases). Furthermore, the catholyte and the anolyte are separated by at least one ion-permeable membrane or bipolar membrane (discussed briefly below).

FIG. 1 is a schematic of a flow-assisted battery 10 according to some embodiments of this invention. The catholyte 12 usually comprises a solution of at least one chlorate salt, e.g., sodium chlorate or lithium chlorate, when the battery is in the charged state. The anolyte 14 comprises an aqueous solution of the electrochemically active material, as described above. The anolyte can optionally include a buffer. Moreover, a portion of the zinc can be present within the anolyte, in the form of a slurry or a fine powder or sheet of material that detaches from the surface of the anode.

The central structure 16 of the battery, i.e., a bipolar cell stack, includes a series of alternating positive plates 18 and negative plates 20, separated by ion-permeable or bipolar membranes 22. Each of the positive and negative electrodes may include an electrically-conductive substrate, such as carbon (in a conductive form), a conductive metal oxide, or a metal.

The ion-permeable membrane is used to separate the anolyte and the catholyte, and in most cases, to provide proton transport. A number of different types of membranes can be used. One example is a proton exchange membrane, often incorporated into proton exchange membrane (PEM) fuel cells. A number of materials can be used for such a membrane; and they are generally well-known in the art. In some cases, sulfonated fluoropolymer-copolymers could be used, e.g., Nafion®-type materials. These types of membranes are oxidatively stable, and are often relied upon by the chlor-alkali industry.

However, in some preferred embodiments, the bipolar membranes mentioned above are employed. These are two-layer membranes, in which one layer is often anionic, and the other layer is protonic. A non-limiting commercial example is a Fumasep® bipolar membrane, available from Fumatech (BWT Group).

In operation, the anolyte regions of the cell would be formed of a metal or metal alloy in the charged state. The metal/metal alloy is capable of being dissolved into a salt, during a redox reaction, e.g., a metal chloride, a metal acetate, or a metal glycolate, or a mixture thereof. On the catholyte side, a metal chlorate is converted into the corresponding metal chloride during the discharge. The reactions are reversed during the charging cycle. Thus, for some primary embodiments of this invention, the chlorate species is being converted into a chloride ion upon discharge, while the chloride-to-chlorate reaction occurs during charging. On the anode side, metal ions are converted into the respective metal itself during charging; while the metal is dissolved into a corresponding salt, such as the chloride salt, acetate salt, or glycolate salt, during discharge.

Those skilled in the art understand that the battery 10 may include various other features and devices as well. As mentioned above, non-limiting examples include current collectors (not specifically shown), and additional electrodes. (Thus, an electrode and a separate catholyte storage tank can be associated with the catholyte chamber; while another electrode and a separate anolyte storage tank can be associated with the anolyte chamber). Other features of the flow battery system may include pumps 26, for circulating the catholyte and anolyte solutions through system 10, via tubes/conduits 30. Conventional pumps can be used. Other methods for circulating the solutions are also possible, e.g., gravity-based systems. A number of references describe various features of flow batteries, e.g., U.S. Patent Application 2014/0132238 (Zaffou et al), incorporated herein by reference. Moreover, in some embodiments, the flow battery can be designed as a plurality of single batteries (electrochemical cells), having common anolyte and catholyte storage tanks.

Other examples of features and devices for the battery include sensors for pressure measurement and control; and for gas flow; temperature; and the like. Battery systems of this type will also include associated electrical circuitry and devices, e.g., an external power supply; as well as terminals for delivering battery output when necessary. Other general considerations regarding flow batteries can be found in a number of references, e.g., "Zinc Morphology in Zinc-Nickel Flow Assisted Batteries and Impact on Performance"; Y. Ito et al; Journal of Power Sources 196 (2011) 2340-2345. A theoretical open circuit potential for cells with anodes made of zinc is 2.21 V (volts).

Figure 2:
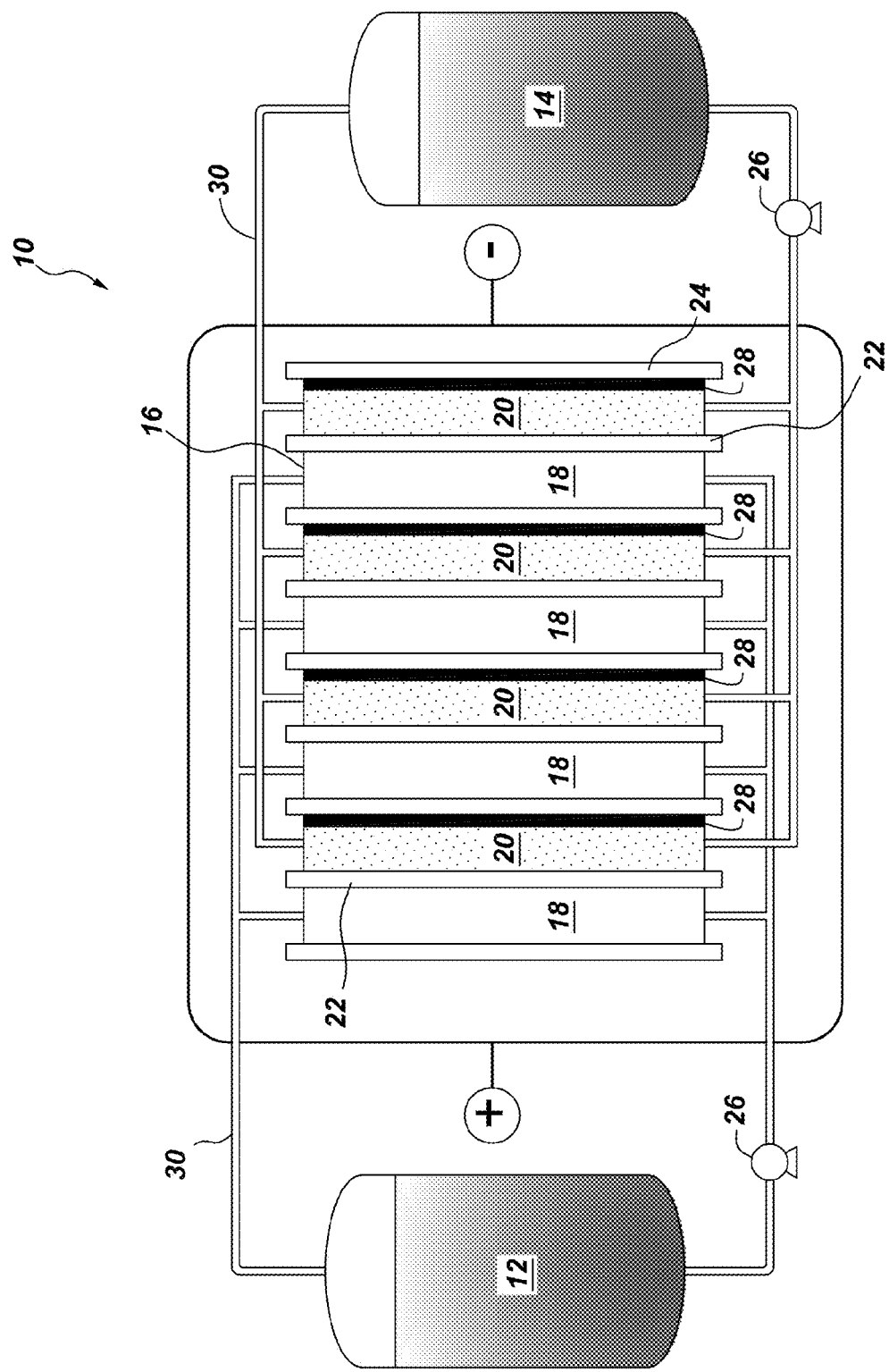
FIG. 2 is a simplified schematic of a flow battery according to another embodiment of this invention.

FIG. 2 is a schematic of a flow-assisted battery 10, according to other embodiments of the invention. Reference numerals common to the system of FIG. 1 represent similar or identical elements. Again, the catholyte 12 usually comprises a solution of at least one halide salt, e.g., sodium chlorate, when the battery is in the charged state. The anolyte 14 comprises an aqueous solution of the electrochemically active material, as described above, with or without a buffering compound. As in the embodiment of FIG. 1, the central structure of the battery, i.e., a bipolar cell stack, includes a series of alternating positive plates 18 and negative plates 20, separated by ion exchange or bipolar membranes 22. Each of the positive and negative electrodes may include an electrically-conductive substrate, such as carbon (in a conductive form), a conductive metal oxide, or a metal.

In this embodiment, the anolyte regions of the cell would include a plated zinc deposit 28, in the charged state, which is then dissolved into a salt, such as zinc chloride, zinc acetate, or zinc glycolate, or a mixture thereof. On the catholyte side, a metal chlorate (or another metal halate) is converted into the corresponding chloride (e.g., sodium chloride or another zinc halide) during the discharge. The reactions are reversed during the charging cycle. Thus, for some primary embodiments of this invention, the chlorate species is being converted into a chloride ion upon discharge, while the chloride-to-chlorate reaction occurs during charging. On the anode side, Zn ions are usually converted into zinc metal during charging; while the zinc metal is dissolved into a zinc salt, such as the chloride salt, during discharge. Significant advantages for these types of cells, containing the zinc-deposited anode, arise from the relatively high electrical potential and solubility of the zinc material; and this will desirably result in relatively high energy density. These results are enhanced when the aqueous electrolyte (anolyte) composition described herein is employed.

As mentioned above, a frequent problem in electrochemical reactions involving zinc is the formation of zinc dendrites. In the case of a zinc battery, the dendrites, due in part to their elongate, pointed shape, can penetrate the membrane of the battery, and cause a short circuit or other damage to the device. Embodiments of the present invention can minimize or eliminate this problem. In some cases, the use of the electrolyte composition described herein can reduce the number of dendrites formed. In other cases, the same number of dendrites might be formed, but their shape is rounded or otherwise "blunted" or sponge-like. The modified shape prevents most, or all, of the dendrites from being able to penetrate the membrane. Thus, their adverse effect on the performance of the battery can be decreased.

As described in Application PCT/US14/041374, the flow batteries described herein can also be used for electrical vehicles, trucks, ships, and trains, as well as for other applications, such as submarines and airplanes. EVs include electric cars and hybrid electric cars. The flow batteries could be incorporated as part of an electric powertrain, alone or supporting an internal combustion system. The flow batteries could also be used as an independent electric source for the vehicle, e.g., for lighting, audio, air conditioning, windows, and the like. Additional end uses include grid energy storage systems, e.g., the incorporation of at least one flow battery (usually one module or stack of multiple flow battery cells) into at least one component attached to or incorporated into an electrical power grid.

EXAMPLES

The following examples illustrate methods and embodiments in accordance with the invention. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

A series of salt-containing compositions were prepared by dissolving alternately small amounts of a zinc salt and a salt of a monovalent cation, until the saturation point had been reached, as shown in Table 1. The individual salts were generally components in the electrolyte compositions described previously. The monovalent cation/zinc salt (if present) is indicated in column 1. ("None" indicates there was no additional salt added to the solution).

Column 2 in Table 1 shows the individual solubility values, in moles/liter, for the indicated additive from column 1. Column 3 shows the zinc ion solubility in the binary system, i.e., zinc acetate plus monovalent cation salt. Column 4 lists the monovalent cation salt solubility in the binary system. Column 5 shows the pH values for the monovalent cation salt solution; while column 6 shows the pH values for the binary system itself.

The data of Table 1 show that that the solubility of zinc acetate is significantly increased in binary systems with MX salts. The lithium chloride and ammonium chloride salts allow for especially high solubility of zinc acetate in the binary system, indicating chemical association with the zinc component in the solution. Moreover, the presence of the additive salt (M+) in each solution provided desirable pH values for the binary system. Thus, zinc solutions of high molarity can be obtained in essentially neutral solutions. This is generally not possible for individual solutions of any zinc salt.

TABLE 1

| 1<br>M+ salt* | 2<br>Individual M+ solubility, M | 3<br>$Zn^{2+}$ solubility in binary system, M | 4<br>M+ solubility in binary system | 5<br>pH M+ salt | 6<br>pH binary system |
|---|---|---|---|---|---|
| None | — | 1.66 | — | — | 3.5 |
| NaCl | 5.4 | 2.74 | 5.44 | 7.3 | 5.3 |
| NaAc | 4.6 | 2.63 | 5.25 | 10.1 | 7.2 |
| NaCl + NaAc | nd** | 2.75 | 4.45 | 7.3-10 | 5.3-7.2 |
| NaGly | 5.2 | 3.2 | 6.38 | 8.6 | 6.8 |
| NaBr | 6.7 | 3.39 | 6.79 | 4.6 | 5.6 |
| KCl | 4.1 | 2.05 | 4.1 | 9.8 | 5.7 |
| LiCl | >13 | 3.5 | >7.0 | 7.9 | 4.9 |
| $NH_4Cl$ | 4.5 | >3.5 | >7.0 | 4.7 | 5.7 |

*"M" = Monovalent cation salt
**No data obtained

Figure 3:
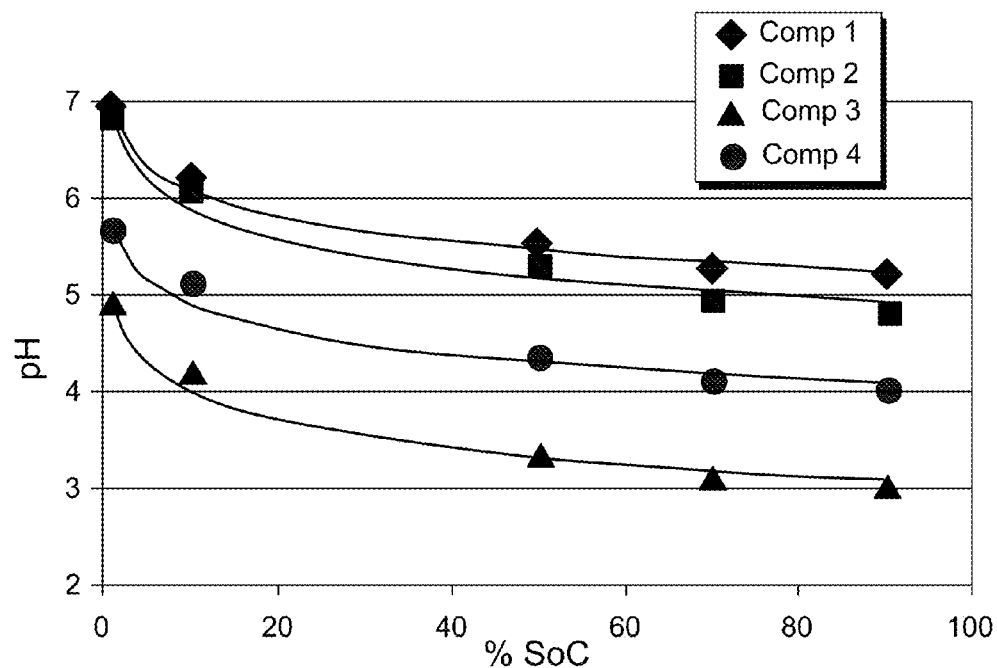
FIG. 3 is a graph depicting the pH of selected electrolyte compositions, as a function of state-of-charge (% SoC).

FIG. 3 is a graph depicting the pH of the indicated compositions, as a function of state-of-charge (% SoC), modelling the use of these compositions as anolytes in the zinc-chlorate flow battery. The compositions were prepared by replacing a corresponding part of zinc acetate in a saturated composition, with a double equivalent of acetic acid. The graph is based on data from four compositions. Composition 1 ("Comp 1") is a saturated solution of zinc acetate and 2:1 sodium acetate-sodium chloride. Composition 2 is a saturated solution of zinc acetate and sodium glycolate. Composition 3 is saturated solution of zinc acetate and lithium chloride, while composition 4 is a saturated solution of zinc acetate and ammonium chloride. The data demonstrate that the MX (monovalent cation) salts work as effective buffers, i.e., in desirably preventing the pH of the solution from going below 3. This is the case, even at high concentrations of acetic acid. In the absence of the MX salts, the pH in that instance would be below 1.0.

Figure 4:
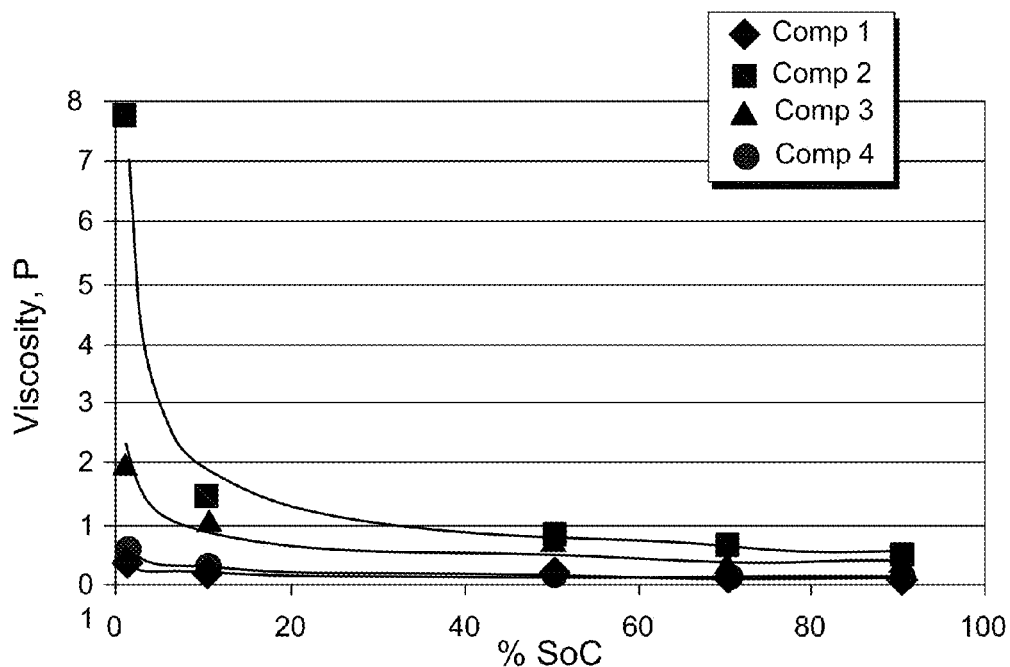
FIG. 4 is a graph depicting the viscosities of selected electrolyte compositions, as a function of state-of-charge (% SoC).

FIG. 4 is a graph depicting the viscosities of the solutions described above, as a function of the state-of-charge (% SoC). The unusually high viscosities of compositions 2 and 3, i.e., the glycolate and lithium salts, respectively, are an indication of increased chemical association, as mentioned previously.

Figure 5:
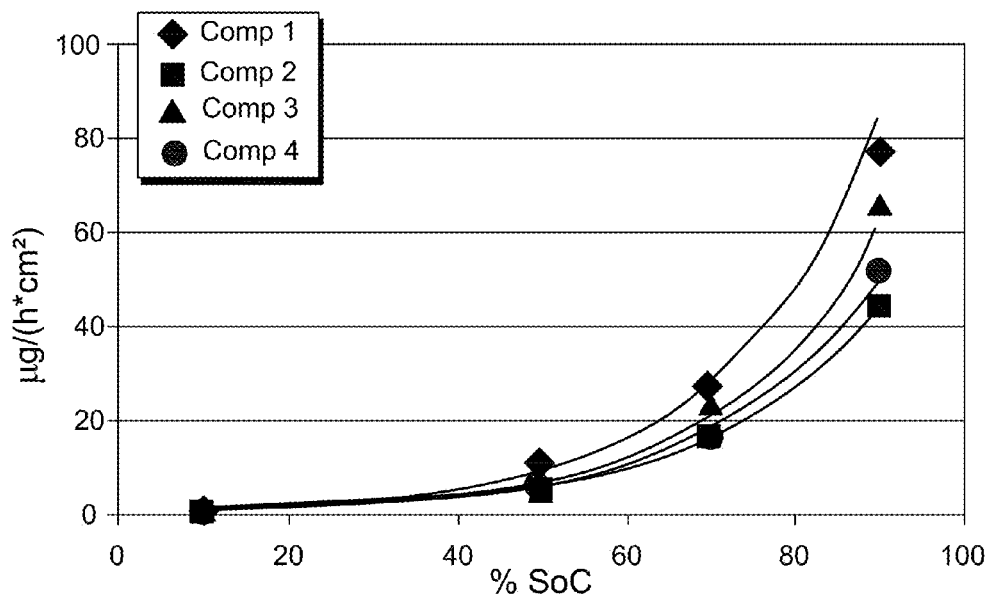
FIG. 5 is a graph depicting zinc corrosion values, as a function of state-of-charge.
Figure 6:
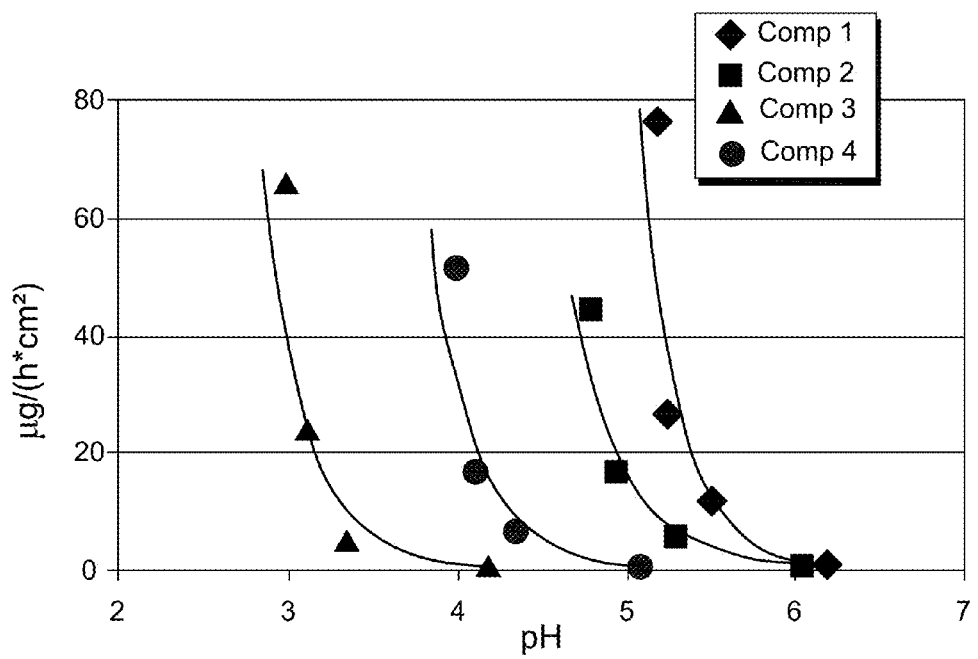
FIG. 6 is a graph depicting zinc corrosion values, as a function of pH.

FIGS. 5 and 6 each represent zinc corrosion data in solutions based on embodiments of the present invention. FIG. 5 depicts corrosion values (expressed as micrograms of zinc per hour per unit surface area), as a function of SoC. FIG. 6 shows the same data, as a function of the pH values for each solution. The data clearly demonstrate that the degree of corrosion depends on the identity of the monovalent cation, as well as on the pH of the particular solution.

Figure 7:
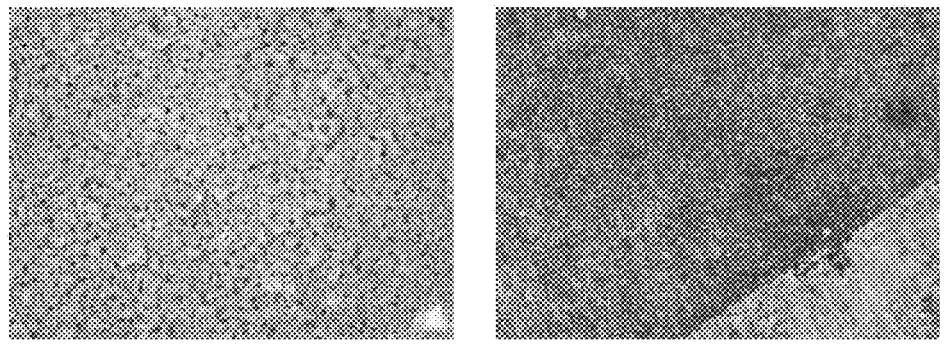
FIG. 7 is a set of photomicrographs depicting the surface and appearance of zinc layers plated according to some embodiments of the invention.

FIG. 7 is a set of two photomicrographs, based on the plating of a layer of zinc from an acidic solution in an undivided cell onto a zinc flat electrode at room temperature and 200 ASF (215 mA/cm²). The left photograph represents plating from an ammonium-based M+ solution, while the right photograph shows plating from a lithium-based M+ solution. Each photomicrograph shows the flat topology of the plated layer. Both electrolytes were made by replacing 50% of the zinc acetate in saturated solution with a double equivalent of acetic acid. In other words, the electrolytes corresponded to 50% SoC of the anolytes, as modelled for use in the zinc-chlorate flow battery. The different topologies obtained are an indication that the surface appearance and texture of a plated zinc layer can be adjusted or "tuned", by proper selection of an appropriate M+ salt additive.

Figure 8:
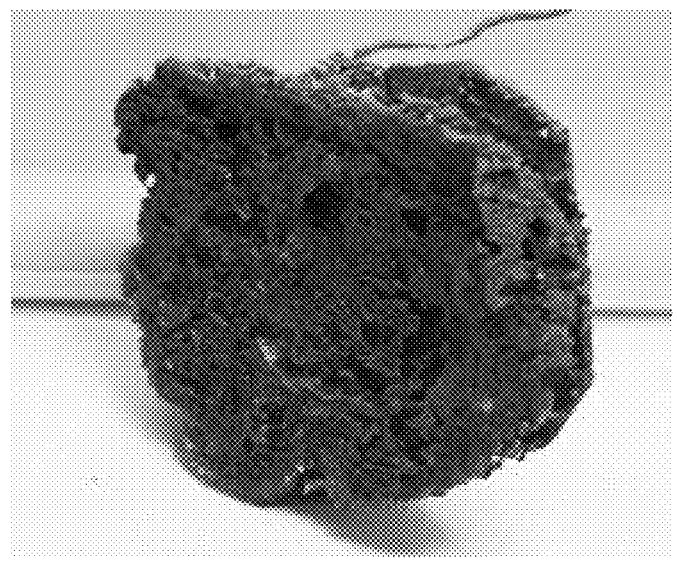
FIG. 8 is a photomicrograph of a zinc structure formed upon the charging of electrolytes in a flow battery cell, according to some embodiments of the invention.

FIG. 8 is a depiction of a thick zinc deposit that formed between a flat electrode and a membrane, upon the charging of electrolytes in a divided flow battery cell. The cell was based on a 3M sodium chloride catholyte, a Nafion® 117 membrane, operating at room temperature and 150 ASF (161.4 mA/cm²). A 3M zinc acetate-6M lithium chloride electrolyte was charged from 0 to 10% SoC.

This is typically the environment in which zinc dendrites are formed, and they can be detrimental to battery performance, as noted above. However, in this instance, the zinc mass formed using electrolyte solutions of the present invention is soft and sponge-like, without any significant sharp, strong protrusions. Therefore, this zinc mass/dendrite will typically be incapable of penetrating a zinc flow battery membrane and damaging the battery in that manner.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. A flow battery, comprising:
    (a) a first chamber (catholyte) comprising an aqueous solution of at least one salt of a halogen oxoacid;
    (b) a second chamber (anolyte) comprising an aqueous solution of an electrochemically active material that is capable of participating in a reduction-oxidation (redox) reaction with the salt of component (a);
    (c) at least one membrane separating the first chamber from the second chamber; and
    (d) means for flowing the aqueous solutions through the battery;
    wherein the second chamber (anolyte) contains an electrodeposited zinc anode; and the aqueous solution of the electrochemically active material has a pH between 4.5 and 7; and comprises
        i) a zinc salt selected from zinc acetate, zinc glycolate, and combinations thereof, wherein the saturation concentration of zinc in the electrolyte composition is in the range of 2.5M to about 3.5M; and
        ii) at least one salt of a monovalent cation selected from sodium, potassium, lithium, and ammonium; wherein the molar ratio of zinc to the monovalent cation is about 1:2.

2. The flow battery of claim 1, configured to promote the reversible redox(oxidation-reduction) reaction that converts any of $(ClO_3^-)$ to $Cl^-$, $(BrO_3^-)$ to $Br^-$ or $(IO_3^-)$ to $I^-$.

3. The flow battery of claim 1, wherein the salt is a chlorate salt and the oxoacid acid is chloric acid, $HClO_3$.

4. The flow battery of claim 3, wherein the chlorate salt is sodium chlorate, lithium chlorate, or combinations thereof.

5. The flow battery of claim 1, including a bipolar cell stack that comprises a series of electrically-conductive electrodes and alternating positive plates and negative plates, each separated by one of the membranes.

6. The flow battery of claim 5, wherein a material providing the electrically-conductive characteristic of the plates is a metal, a conductive form of carbon, or a conductive metal oxide or combinations thereof.

7. The flow battery of claim 1, wherein the membrane separating the first chamber from the second chamber is a bipolar membrane.

8. An electric vehicle or an electric grid system that includes at least one flow battery according to claim 1.

9. The flow battery of claim 1, wherein the aqueous solution of the electrochemically active material further comprises acetic acid.

10. The flow battery of claim 1, wherein the zinc salt is zinc glycolate.

11. The flow battery of claim 1, wherein the monovalent cation is sodium.

12. The flow battery of claim 1, wherein the monovalent cation is potassium.

13. The flow battery of claim 1, wherein the monovalent cation is lithium.

14. The flow battery of claim 1, wherein the monovalent cation is ammonium.

* * * * *